(12) United States Patent
Yeh

(10) Patent No.: US 7,605,360 B2
(45) Date of Patent: Oct. 20, 2009

(54) POWER SUPPLY SYSTEM FOR GREEN LASER INDICATING PEN

(76) Inventor: Chung-Kai Yeh, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/945,275

(22) Filed: Nov. 27, 2007

(65) Prior Publication Data

US 2009/0134311 A1 May 28, 2009

(51) Int. Cl.
*H01J 40/14* (2006.01)
(52) U.S. Cl. .................. 250/221; 250/552; 345/157
(58) Field of Classification Search ............ 250/221, 250/216, 205, 214 R, 552; 345/157–158, 345/179, 182–183; 607/89
See application file for complete search history.

(56) References Cited

U.S. PATENT DOCUMENTS

2008/0077198 A1* 3/2008 Webb et al. .................. 607/88

\* cited by examiner

*Primary Examiner*—Kevin Pyo

(57) ABSTRACT

A power supply system for a green laser indicating pen, comprises a computer having an USB receptacle which is connected to a current source in the computer; a USB plug being connected to the USB receptacle; a USB transmission line for connecting the USB plug to a transformer; a chargeable battery connected to the transformer for receiving current from the computer so as to charge the chargeable battery; a voltage level detector connected to the chargeable battery for comparing the voltage of the voltage level detector with a reference voltage in the voltage level detector; an indicator light connected to the voltage level detector for displaying the voltage state with different colors; and a power switch being connected between the transformer and the laser source; as the power switch being actuated, the power from the transformer can be directly transferred to the laser source.

3 Claims, 6 Drawing Sheets

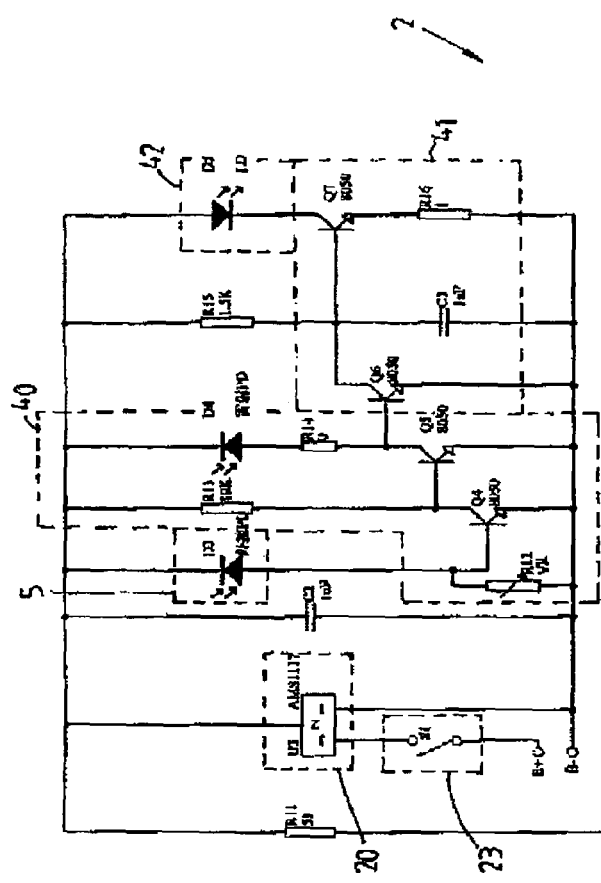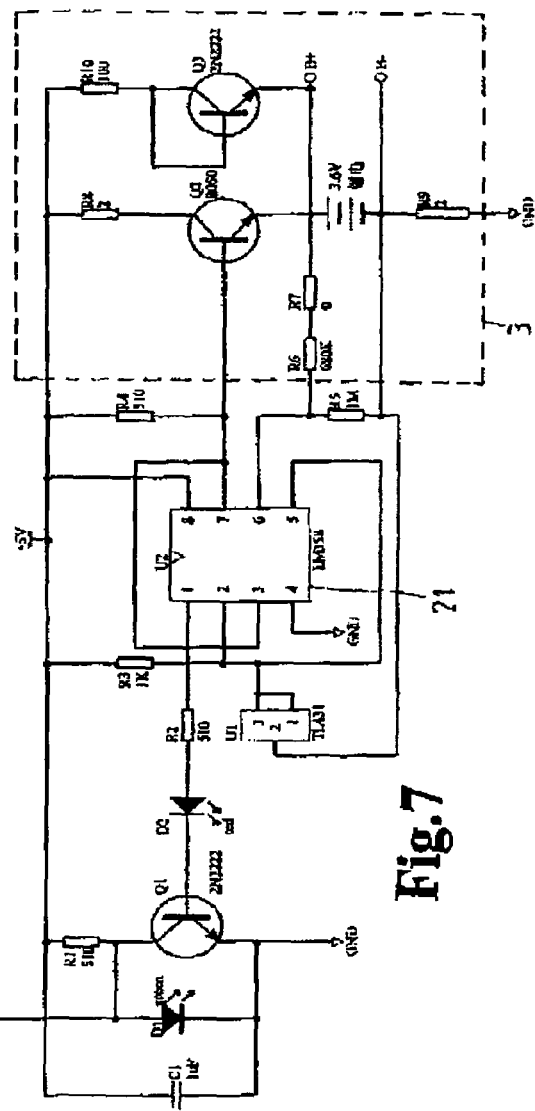
Fig. 7

POWER SUPPLY SYSTEM FOR GREEN LASER INDICATING PEN

FIELD OF THE INVENTION

The present invention relates to laser devices, and particularly to a power supply system for a green laser indicating pen; wherein the power source of a computer is transferred to a transformer through a USB transmission line; and then the power is transferred to a chargeable battery which can provide power to a green laser source as the power from the chargeable battery is permissible by a voltage level detector. Furthermore, a power switch can directly provide power from the transformer to the laser source as the power in the chargeable battery is insufficient or the chargeable battery is in charging.

BACKGROUND OF THE INVENTION

Referring to FIGS. 1 and 2 the prior art laser indicating pen is illustrated. The pen includes a casing C, a front cover G, a rear cover H, a circuit board I and a mercury battery or a dry battery E. The circuit board I is installed in the casing C. A front end of the circuit board I has a laser diode D resisting against the front cover G and a rear end thereof is connected to a compressible spring resisting against the mercury battery or a dry battery E. An upper end thereof is connected to a key switch A for actuating a switch. A preset circuit is actuated by the casing C so that the DC current in the battery E will conduct the casing C and thus the laser diode D will emit red laser light which is emitted out through a light hole B. When the key switch of the laser diode is pressed, the circuit on the casing C will turn off so that the DC current of the battery E will not conduct with the circuit board D. Thus the laser diode D will not emit red laser light.

From above description, it is known that the power of the laser indicating pen is wholly from the dry battery or mercury battery. Although it consumes less power then a green laser light. However the power of the battery will exhaust (even the laser indicating pen is not used). Thus it is necessary to update a new battery for supplying DC current continuously. The battery can not be used so that it must be deserted. However this will have the problem of environment protection and the cost can not be reduced.

SUMMARY OF THE INVENTION

Accordingly, the primary object of the present invention is to provide a power supply system for a green laser indicating pen; wherein the power source of a computer is transferred to a transformer through a USB transmission line; and then the power is transferred to a chargeable battery which can provide power to a green laser source as the power from the chargeable battery is permissible by a voltage level detector. Furthermore, a power switch can directly provides power from the transformer to the laser source as the power in the chargeable battery is insufficient or the chargeable battery is in charging.

To achieve above objects, the present invention provides a laser indicating pen, comprising: a computer having an USB receptacle which is connected to a current source in the computer; a USB plug being connected to the USB receptacle; a USB transmission line for connecting the USB plug to a transformer so that transfer the current from the computer to a predetermined current for supplying to the following stage; a chargeable battery connected to the transformer for receiving current from the computer so as to charge the chargeable battery; a voltage level detector connected to the chargeable battery for comparing the voltage of the voltage level detector with a reference voltage in the voltage level detector; an indicator light connected to the voltage level detector for displaying the voltage state with different colors; if the voltage from the chargeable battery being matched to a required voltage, the current from the chargeable battery being supplied to a laser source for emitting green laser light form a optical hole; and a power switch being connected between the transformer and the laser source; as the power switch being actuated, the power from the transformer can be directly transferred to the laser source.

The various objects and advantages of the present invention will be more readily understood from the following detailed description when read in conjunction with the appended drawing.

BRIEF DESCRIPTION OF THE DRAWINGS

FIG. 7 is a circuit diagram of the power supply system for a green laser indicating pen of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
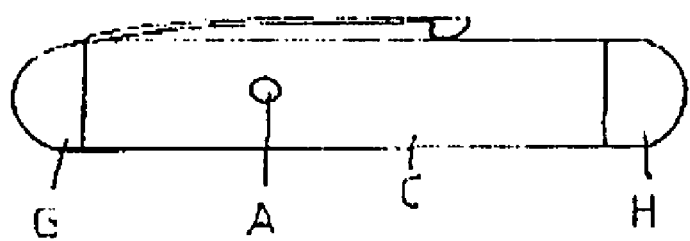
FIG. 1 is a plane view about a prior art laser indicating pen.
Figure 2:
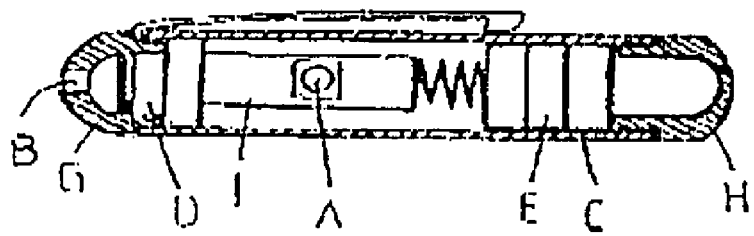
FIG. 2 is a plane schematic view about a prior art laser indicating pen.
Figure 3:
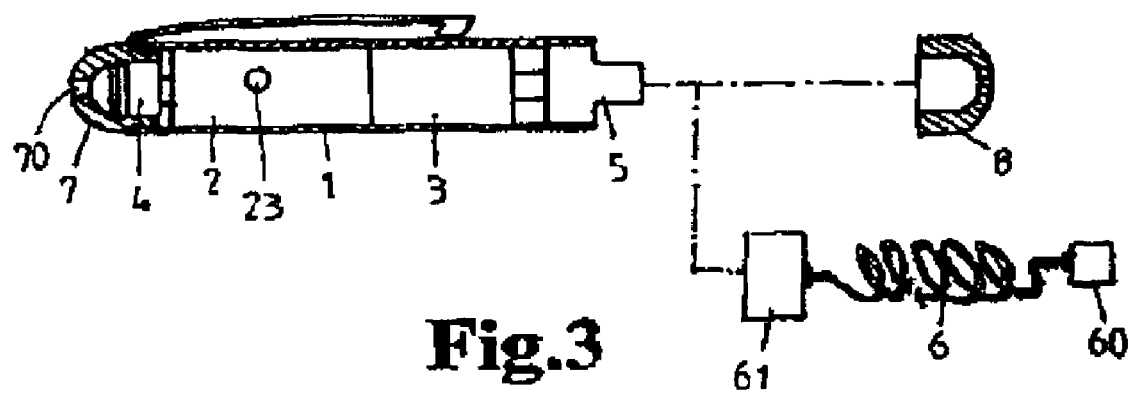
FIG. 3 is a cross sectional view about a charging device of a power supply system for a green laser indicating pen.
Figure 4:
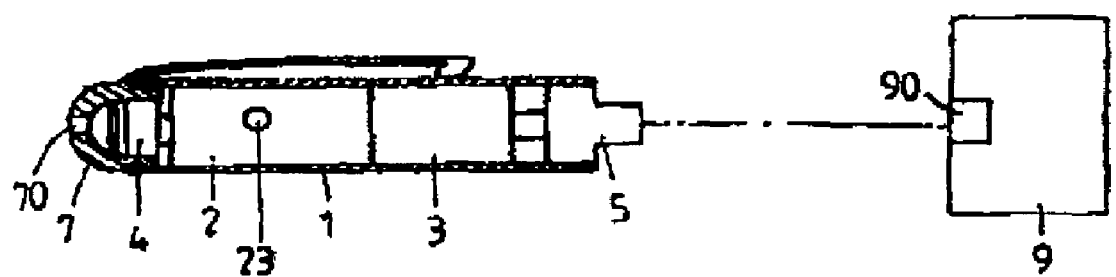
FIG. 4 is a plane schematic view showing that the present invention is directly attached to a computer USB receptacle for power charge.
Figure 5:
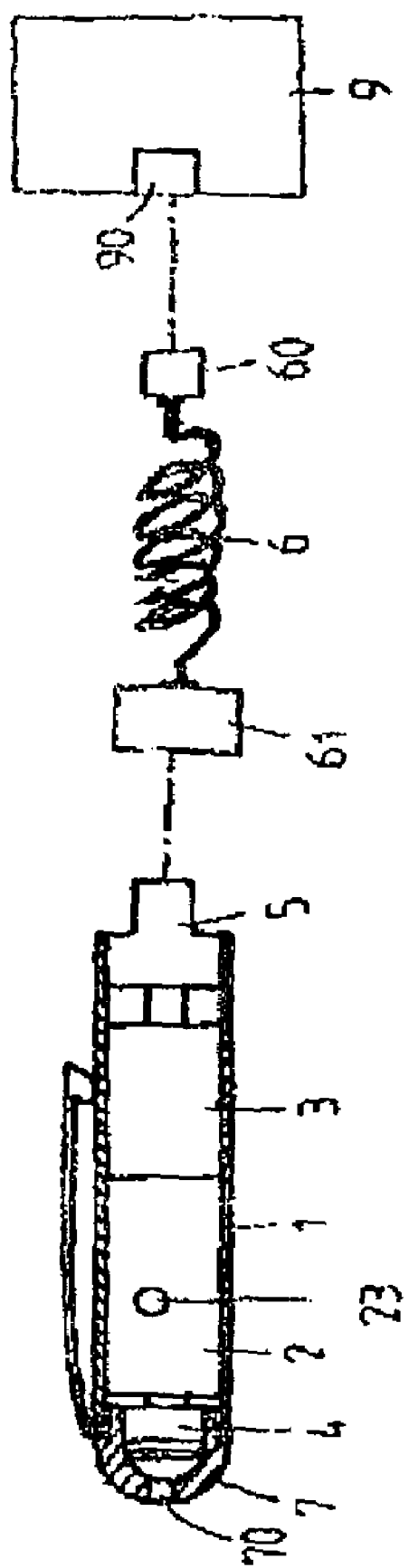
FIG. 5 is a plane schematic view which shows the transmission line of the present invention is inserted into the USB receptacle.
Figure 6:
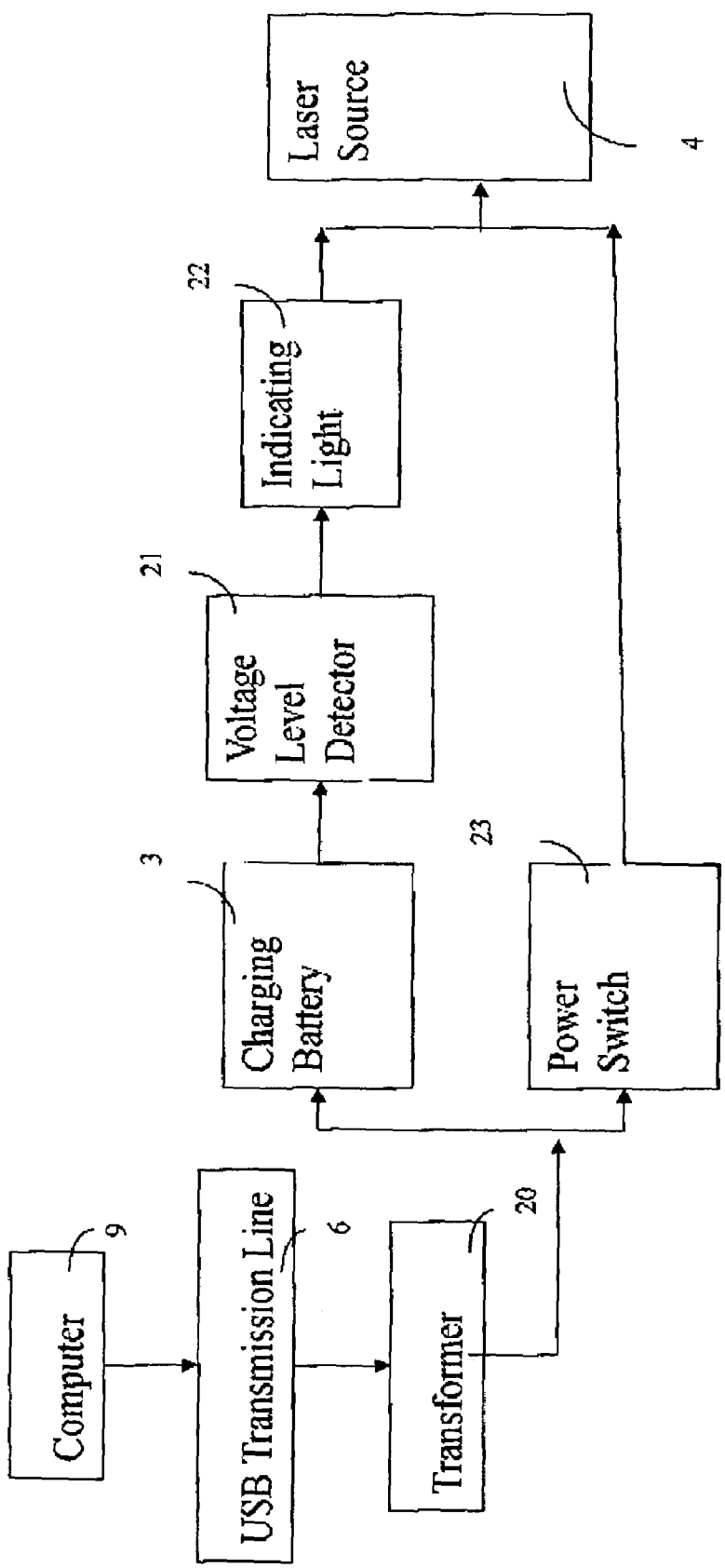
FIG. 6 is a block diagram about the power supply system for a green laser indicating pen of the present invention.
Figure 8:
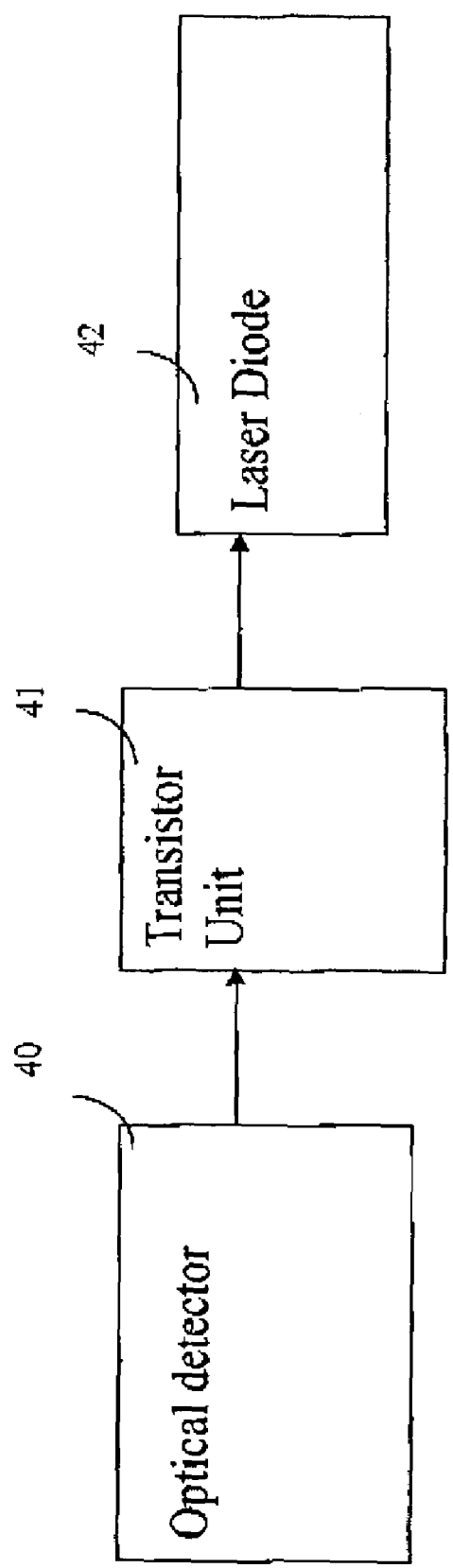
FIG. 8 is a block diagram of the power supply system for a green laser indicating pen with a charging device according to the present invention.

Referring to FIG. 4 to 6, a green laser light indicating pen with a charging device of the present invention is illustrated.

A computer 9 has an USB receptacle 91 which is connected to a current source in the computer 9. A USB plug 5 is connected to the USB receptacle 90. A USB transmission line 6 serves to connect the USB plug 5 to a transformer 20 through two terminals 60, 61 so as to transfer the current from the computer 9 to another predetermined current for supplying to the following stage. The terminal 61 serves to connect the USB plug 5 and the terminal 60 serves to connect the USB receptacle 90.

A chargeable battery 3 to the transformer 20 for receiving current from the computer 9 so as to charge the chargeable battery 3.

A voltage level detector 21 is connected to the chargeable battery 3 for comparing the voltage of the voltage level detector 21 with a reference voltage in the voltage level detector 21.

An indicator light 22 is connected to the voltage level detector 21 for displaying the voltage state with different colors. If the voltage from the chargeable battery 3 is matched to a required voltage, the current from the chargeable battery 3 is supplied to a laser source 4 for emitting green laser light form an optical hole 70.

A power switch 23 is connected between the transformer 20 and the laser source 4. As the power switch 23 is actuated, the power from the transformer 20 can be directly transferred to the laser source 4.

Referring to FIGS. 3 to 7, it is illustrated that the laser indicating pen of the present invention has a casing 1. A front cover 7 is installed at a front side of the casing 1 and a rear cover 8 is installed at a rear side of the casing 1.

The circuit device 2, the chargeable battery 3, the laser source 4, and the USB plug 5 are installed in the casing 1 with the connection as above mentioned.

A front opening of the casing 1 is sealed by the front cover 7 and the laser source 4 is retained at a front inner side of the casing 1. The USB plug 5 is retained at a rear inner side of the casing 1. The rear cover 8 seals a rear opening of the casing 1.

The circuit device 2 includes the transformer 20, the voltage level detector 21, the indicator light 22 and the power switch 23.

The structural view of the laser indicating pen of the present invention is illustrated. It is illustrated that the laser source 4 includes an optical detector 40, a transistor unit 41 and a laser diode set 42. The optical detector 40 serves to analyze optical signals and then transfer the signals into electric signals so as to adjust the current which is then sent to the transistor unit 41. The transistor unit 41 serves to drive the laser diode 42 to emit green laser.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A power supply system for a green laser indicating pen, comprising:

a computer having an USB receptacle which is connected to a current source in the computer; a USB plug being connected to the USB receptacle; a USB transmission line for connecting the USB plug to a transformer so that transfer the current from the computer to a predetermined current for supplying to the following stage;

a chargeable battery connected to the transformer for receiving current from the computer so as to charge the chargeable battery;

a voltage level detector connected to the chargeable battery for comparing the voltage of the voltage level detector with a reference voltage in the voltage level detector;

an indicator light connected to the voltage level detector for displaying the voltage state with different colors; if the voltage from the chargeable battery being matched to a required voltage, the current from the chargeable battery being supplied to a laser source for emitting green laser light form a optical hole; and a power switch being connected between the transformer and the laser source; as the power switch being actuated, the power from the transformer can be directly transferred to the laser source.

2. The power supply system for a green laser indicating pen as claimed in claim 1, further comprising a casing; a front cover being installed at a front side of the casing and a rear cover installed at a rear side of the casing;

wherein a circuit device, the chargeable battery, the laser source, and the USB plug are installed in the casing with the connection as above mentioned;

wherein a front opening of the casing is sealed by the front cover and the laser source is retained at a front inner side of the casing; the USB plug is retained at a rear inner side of the casing; and the rear cover seals a rear opening of the casing; and wherein the circuit device includes the transformer, the voltage level detector, the indicator light and the power switch.

3. The power supply system for a green laser indicating pen as claimed in claim 2, wherein the laser source includes an optical detector, a transistor unit and a laser diode set; the optical detector serves to analyze optical signals and then transfer the signals into electric signals so as to adjust the current which is then sent to the transistor unit; the transistor unit serves to drive the laser diode to emit green laser.

* * * * *